United States Patent
Ryu et al.

(10) Patent No.: US 10,998,597 B2
(45) Date of Patent: May 4, 2021

(54) BATTERY MODULE PROVIDED WITH CONNECTOR BREAKING DEVICE

(71) Applicant: LG CHEM, LTD., Seoul (KR)

(72) Inventors: Jae-Uk Ryu, Daejeon (KR); Dal-Mo Kang, Daejeon (KR); Su-Chang Kim, Daejeon (KR); Jeong-O Mun, Daejeon (KR); Ji-Su Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 106 days.

(21) Appl. No.: 16/469,411

(22) PCT Filed: Jun. 18, 2018

(86) PCT No.: PCT/KR2018/006859
§ 371 (c)(1),
(2) Date: Jun. 13, 2019

(87) PCT Pub. No.: WO2019/045238
PCT Pub. Date: Mar. 7, 2019

(65) Prior Publication Data
US 2020/0099024 A1    Mar. 26, 2020

(30) Foreign Application Priority Data

Aug. 31, 2017  (KR) .................. 10-2017-0111346

(51) Int. Cl.
*H01M 50/20* (2021.01)
*H01M 50/502* (2021.01)
*H01M 50/578* (2021.01)

(52) U.S. Cl.
CPC ......... *H01M 50/20* (2021.01); *H01M 50/502* (2021.01); *H01M 50/578* (2021.01); *H01M 2200/20* (2013.01)

(58) Field of Classification Search
CPC .... H01M 2/1077; H01M 2/206; H01M 2/345; H01M 50/20; H01M 50/502; H01M 50/578
See application file for complete search history.

(56) References Cited

U.S. PATENT DOCUMENTS

2008/0180059 A1   7/2008  Carrier et al.
2008/0241671 A1   10/2008 Cherng
(Continued)

FOREIGN PATENT DOCUMENTS

JP   2007-520180 A   7/2007
JP   2011-210390 A   10/2011
(Continued)

OTHER PUBLICATIONS

English Language Machine Translation of KR 10-1449307 B1, originally published Oct. 8, 2014.
(Continued)

*Primary Examiner* — Olatunji A Godo
(74) *Attorney, Agent, or Firm* — Birch, Stewart, Kolasch & Birch, LLP

(57) ABSTRACT

A battery module includes a pair of battery cells, each battery cell having an electrode lead, and the battery cells being stacked to face each other; a connector configured to connect the electrode leads of battery cells; and a connector breaking device disposed in a space formed between terrace portions of the battery cells and configured to be operated with a pressure applied to the connector breaking device due to swelling of at least one of the battery cells to cut off an electric connection between the connector and the electrode leads is provided. A method to interrupt an electrical connection in a battery module is also provided.

16 Claims, 8 Drawing Sheets

(56) References Cited

U.S. PATENT DOCUMENTS

| | | | |
|---|---|---|---|
| 2009/0159311 A1* | 6/2009 | Zheng | B23K 35/00 174/126.3 |
| 2013/0075242 A1 | 3/2013 | Lim | |
| 2014/0186664 A1 | 7/2014 | Park | |
| 2014/0186667 A1 | 7/2014 | Lee et al. | |
| 2014/0248523 A1 | 9/2014 | Roh et al. | |
| 2015/0044543 A1 | 2/2015 | Yoon et al. | |
| 2015/0162593 A1 | 6/2015 | Lee | |
| 2015/0171480 A1 | 6/2015 | Seo et al. | |

FOREIGN PATENT DOCUMENTS

| | | |
|---|---|---|
| JP | 2014-533424 A | 12/2014 |
| KR | 10-2009-0043717 A | 5/2009 |
| KR | 10-2013-0032958 A | 4/2013 |
| KR | 10-2013-0043258 A | 4/2013 |
| KR | 10-2014-0039451 A | 4/2014 |
| KR | 10-1449307 B1 | 10/2014 |
| KR | 10-2014-0129401 A | 11/2014 |
| KR | 10-1500229 B1 | 3/2015 |
| KR | 10-2016-0026469 A | 3/2016 |
| KR | 10-1608694 B1 | 4/2016 |
| KR | 10-2017-0016065 A | 2/2017 |
| KR | 10-2017-0038497 A | 4/2017 |

OTHER PUBLICATIONS

Supplementary European Search Report mailed in EP Application No. 18851355.0 dated May 29, 2020.
International Search Report issued in PCT/KR2018/006859 (PCT/ISA/210), dated Oct. 11, 2018.

* cited by examiner

BATTERY MODULE PROVIDED WITH CONNECTOR BREAKING DEVICE

TECHNICAL FIELD

The present disclosure relates to a battery module including a connector breaking device, and more particularly, to a battery module including a connector breaking device, which is operated due to swelling occurring at a battery cell to cut off an electric connection between neighboring battery cells.

The present application claims priority to Korean Patent Application No. 10-2017-0111346 filed on Aug. 31, 2017 in the Republic of Korea, the disclosures of which are incorporated herein by reference.

BACKGROUND ART

As portable electric products such as video cameras, cellular phones and portable PCs are used more broadly, the importance of secondary batteries mainly used as a driving power source therefor is increasing.

A secondary battery capable of charging and discharging, different from a primary battery cannot be recharged is being actively studied in high-tech fields such as digital cameras, cellular phones, laptop computers, power tools, electric bicycles, electric vehicles, hybrid electric vehicles and mass-capacity power storage devices.

In particular, a lithium secondary battery has a high energy density per unit weight and allows rapid charging, compared to other secondary batteries such as lead storage batteries, nickel-cadmium batteries, nickel-hydrogen batteries and nickel-zinc batteries, and thus it is used more and more.

The lithium secondary battery has an operating voltage of 3.6V or above. The lithium secondary battery is used as a power source for a portable electronic device, or a plurality of lithium secondary batteries are connected in series or in parallel and used for a high output electric vehicle, a hybrid electric vehicle, a power tool, an electric bicycle, a power storage device or a UPS.

The lithium secondary battery has an operating voltage three times higher than that of a nickel-cadmium battery or a nickel-metal hydride battery and has a high energy density per unit weight. For this reason, the lithium secondary battery tends to be used more and more.

The lithium secondary battery may be classified into a lithium ion battery using a liquid electrolyte and a lithium ion polymer battery using a polymer solid electrolyte depending on an electrolyte type. In addition, the lithium ion polymer battery may be classified into a pure solid lithium ion polymer battery without containing any electrolyte and a lithium ion polymer battery using a gel polymer electrolyte containing an electrolytic solution, depending on a polymer solid electrolyte type.

In the lithium ion battery using a liquid electrolyte, a cylindrical or rectangular metal can is generally used as a container in a welded and sealed form. Since the can-type secondary battery using the metal can as a container has a fixed shape, there is a disadvantage that it restricts the design of an electric product using the can-type secondary battery as a power source, and it is difficult to reduce the volume. Thus, a pouch-type secondary battery prepared by putting an electrode assembly and an electrolyte in a pouch packaging material made of a film and sealing the pouch packaging material has been developed and used.

However, the lithium secondary battery has a risk of explosion when being overheated and thus it is important to secure safety. The lithium secondary battery is overheated due to various factors, one of which is an overcurrent flow above a limit through the lithium secondary battery. If the overcurrent flows, the lithium secondary battery is heated by the Joule heat, so the internal temperature of the battery rises rapidly. In addition, the rapid rise in temperature causes a decomposition reaction of the electrolyte, causing a thermal runaway, which eventually leads to the explosion of the battery. Overcurrent occurs in the case where a sharp metal object penetrates the lithium secondary battery, where the insulation between positive and negative electrodes is destroyed due to the shrinkage of a separator interposed between the positive and negative electrodes, where a rush current is applied to the battery due to abnormality of a charging circuit or a load connected to the outside, or the like.

Thus, the lithium secondary battery is used in combination with a protecting circuit in order to protect the battery against an abnormal situation such as overcurrent, and the protecting circuit generally includes a fuse element for irreversibly disconnecting a line through which a charging or discharging current flows when overcurrent occurs.

FIG. 1 is a circuit diagram for illustrating an arrangement and an operating mechanism of a fuse element provided in a protecting circuit coupled to a battery pack including a lithium secondary battery.

As shown in FIG. 1, in order to protect the battery pack when overcurrent occurs, the protecting circuit includes a fuse element 1, a sensing resistor 2 for sensing overcurrent, a microcontroller 3 for monitoring the occurrence of overcurrent and operating the fuse element 1 when overcurrent occurs, and a switch 4 for switching the inflow of an operating current to the fuse element 1.

The fuse element 1 is installed on a main line connected to an outermost terminal of the battery pack. The main line refers to a wiring through which a charging current or a discharging current flows. In FIG. 1, it is depicted that the fuse element 1 is installed at a high-potential line (Pack+).

The fuse element 1 is a three-terminal element, where two terminals are connected to the main line through which a charging or discharging current flows and one terminal is connected to the switch 4. In addition, the fuse element 1 includes a fuse 1a connected to the main line in series and melted and cut at a certain temperature and a resistor 1b for applying heat to the fuse 1a.

The microcontroller 3 periodically detects the voltage at both ends of the sensing resistor 2 and monitors whether overcurrent occurs. If it is determined that overcurrent occurs, the microcontroller 3 turns on the switch 4. If so, the current flowing on the main line is bypassed to the fuse element 1 and applied to the resistor 1b. Accordingly, the Joule heat generated at the resistor 1b is conducted to the fuse 1a to raise the temperature of the fuse 1a. If the temperature of the fuse 1a rises to the melting temperature, the fuse 1a is melted and broken so that the main line is irreversibly disconnected. If the main line is disconnected, the overcurrent does not flow any more, thereby overcoming the problem caused by the overcurrent.

However, the above conventional technique has several problems. In other words, if the microcontroller 3 is broken, the switch 4 does not turn on even though overcurrent occurs. In this case, a current does not flow into the resistor 1b of the fuse element 1, and thus the fuse element 1 does not operate. Also, a space for disposing the fuse element 1 is separately required inside the protecting circuit, and a program algorithm for controlling the operation of the fuse element 1 must be loaded in the microcontroller 3. Thus, it is disadvantageous that the space efficiency of the protecting circuit is deteriorated and the load of the microcontroller 3 is increased.

DISCLOSURE

Technical Problem

The present disclosure is designed to solve the problems of the related art, and therefore the present disclosure is directed to ensuring safety in use of a secondary battery by rapidly cutting off the flow of current when swelling occurs at a battery cell over a certain level due to the occurrence of abnormal situation such as overcharge or short circuit.

However, the technical problem to be solved by the present disclosure is not limited to the above, and other objects not mentioned herein will be understood from the following description by those skilled in the art.

Technical Solution

In one aspect of the present disclosure, there is provided a battery module, comprising: a pair of battery cells, each battery cell having an electrode lead, and the battery cells being stacked to face each other; a connector configured to connect the electrode leads of the battery cells; and a connector breaking device disposed in a space formed between terrace portions of the pair of battery cells and configured to be operated with a pressure applied to the connector breaking device due to swelling of at least one of the battery cells to cut off an electric connection between the connector and the electrode leads.

The electrode leads may be fixed to the connector breaking device.

The connector breaking device may include a cartridge; a push bar configured to move upwards inside the cartridge in response to the pressure applied to the push bar due to the swelling of the at least one of the battery cells; a first elastic member configured to maintain an elastically compressed state in a direction along one of the electrode leads prior to the pressure being applied to the push bar and to be released when the push bar moves upwards; a breaking unit configured to move toward the connector through an opening formed at a top end of the cartridge due to a restoring force of the first elastic member when the first elastic member is released to cut off an electric connection between the connector and the electrode leads.

The connector breaking device may further include a stopper configured to fix the breaking unit in a fixed state so that the first elastic member maintains the elastically compressed state prior to the pressure being applied to the push bar, the stopper being configured to release the fixed state of the breaking unit when the push bar is pressed due to the swelling of the at least one of the battery cells so that the breaking unit moves toward the connector due to the restoring force of the first elastic member.

The cartridge may include a guide rib formed to protrude from an inner surface thereof and inclined at a predetermined angle with respect to a horizontal line.

The push bar may include a push rib extending upwards toward the guide rib and having one end located between the guide rib and the stopper.

When the push bar is pressed due to the swelling of the at least one of the battery cells, the push rib may change a moving direction in response to contact with the guide rib so that one end of the push rib applies a pressure to one end of the stopper.

The stopper may move with a pressure applied by the push rib to release the fixed state of the breaking unit.

The cartridge may include a support rib formed to protrude from the inner surface thereof, and the connector breaking device may include a second elastic member disposed between the stopper and the support rib to be elastically compressed when the push bar is pressed.

The first elastic member may extend along a first axis and the second elastic member may extend along a second axis perpendicular to the first axis.

The breaking unit may include an extension extending parallel to an axis of the first elastic member, the extension having a first portion having a first thickness and a second portion having a second thickness less than the first thickness. The stopper may have a through hole configured to receive the extension of the breaking unit, and, when the breaking unit is in the fixed state, the second portion is arranged in the through hole and the first portion is arranged below the through hole.

In another aspect of the present disclosure, there is provided a method to interrupt an electrical connection in a battery module, the method comprising: providing a battery module described above; and operating the connector breaking device by applying the pressure to the connector breaking device due to the swelling of the at least one of the battery cells to cut off the electric connection between the connector and the electrode leads.

The connector breaking device may include a cartridge, a push bar, a first elastic member and a breaking unit, and operating the connection breaking device may include causing the push bar to move upwards inside the cartridge in response to pressure applied to the push bar due to the swelling of the at least one of the battery cells; releasing an elastically compressed state of the first elastic member in response to the movement upwards of the push bar to provide a restoring force; and moving the breaking unit toward the connector through an opening formed at a top end of the cartridge due to the restoring force of the first elastic member.

The connection breaking device may include a stopper releasably fixing the breaking unit in a fixed state by releasably maintaining the elastically compressed state of the first elastic member, and operating the connection breaking device may further include displacing the stopper of the connector breaking device to release the fixed state of the breaking unit.

The cartridge may include a guide rib formed to protrude from an inner surface thereof and inclined at a predetermined angle with respect to a horizontal line, the push bar may include a push rib extending upwards toward the guide rib and having one end located between the guide rib and the stopper, and displacing the stopper of the connector breaking device may include changing a moving direction of the push rib by contact with the guide rib such that the push rib applies pressure to an end of the stopper.

Advantageous Effects

According to an embodiment of the present disclosure, it is possible to prevent fire or explosion from being generated at a secondary battery by rapidly cutting off the flow of current when swelling occurs at a battery cell over a certain level due to the occurrence of abnormal situation such as overcharge or short circuit.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

First, the overall configuration of a battery module according to an embodiment of the present disclosure will be described with reference to FIGS. 2 to 5.

Figure 1:
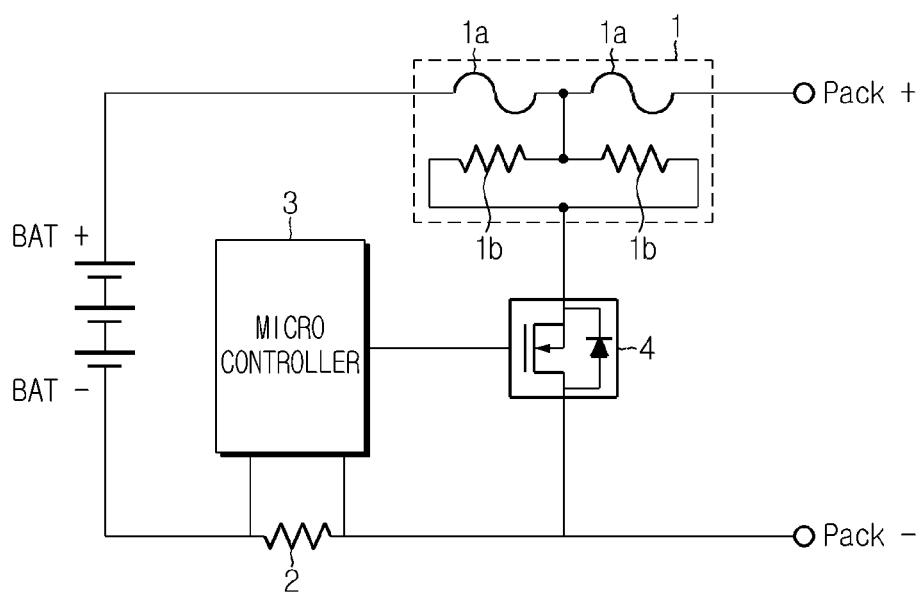
FIG. 1 is a circuit diagram for illustrating an arrangement and an operating mechanism of a fuse element provided in a protecting circuit coupled to a battery module.
Figure 2:
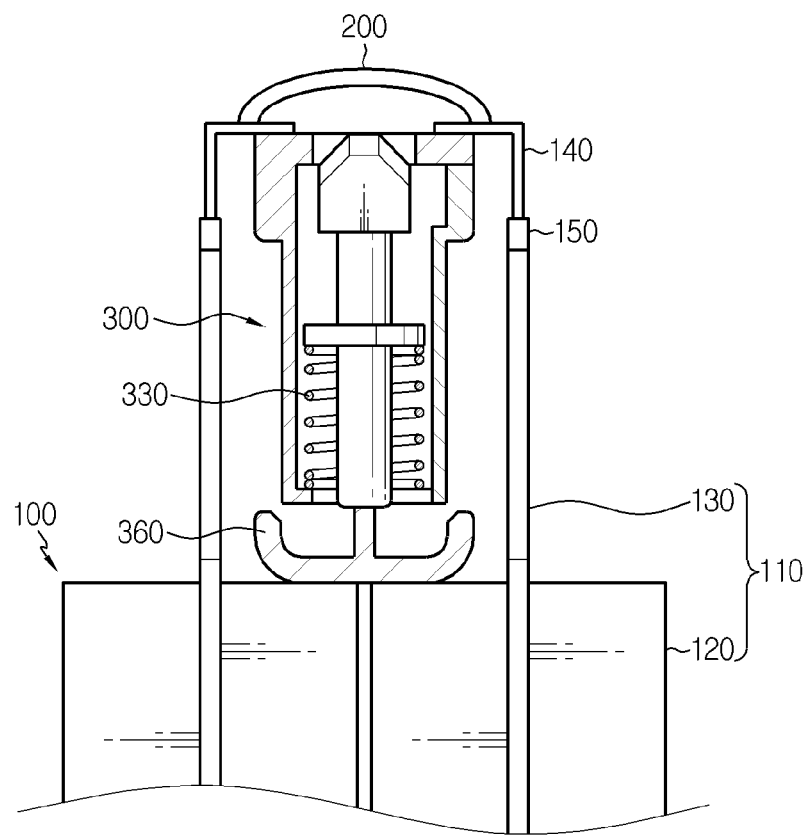
FIGS. 2 and 3 are diagrams showing a state before a connector breaking device operates in the battery module according to an embodiment of the present disclosure.
Figure 3:
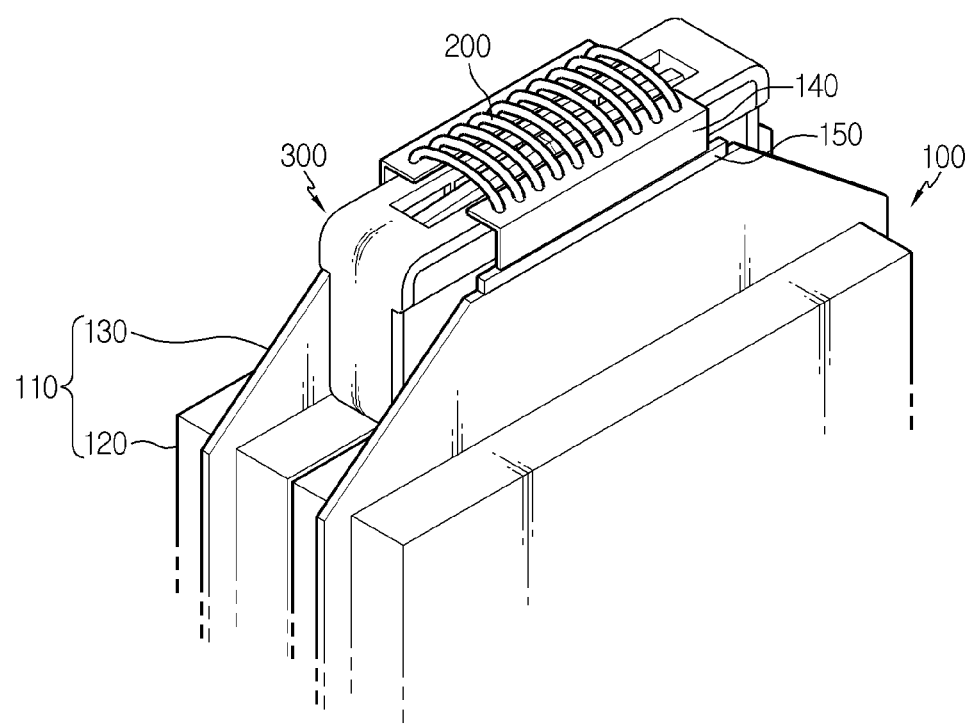
Figure 4:
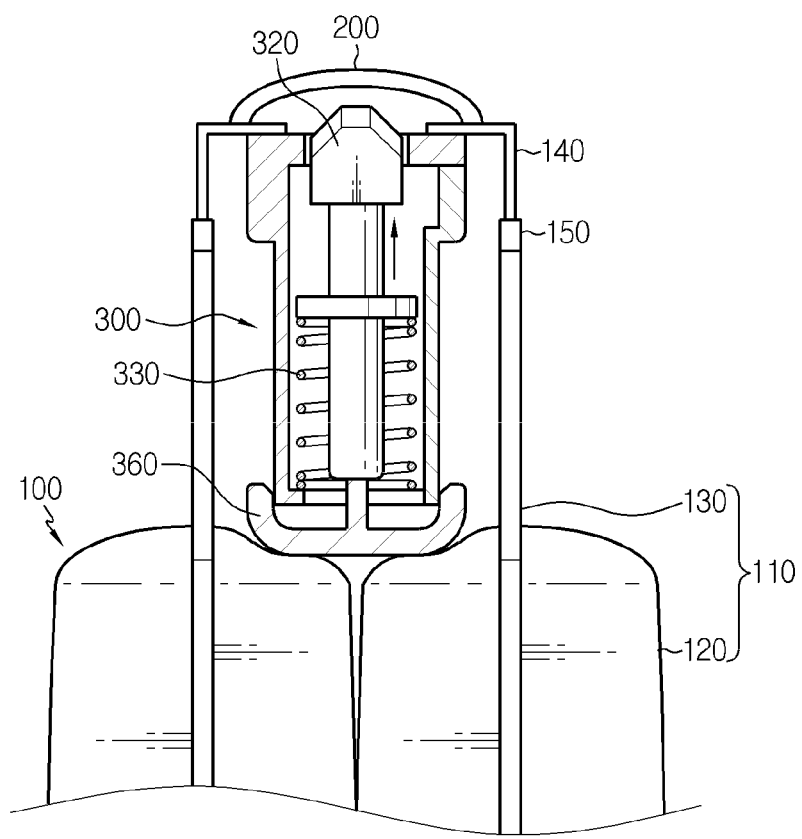
FIG. 4 is a diagram showing that the connector breaking device is operated to move a breaking unit upwards, in the battery module according to an embodiment of the present disclosure.
Figure 5:
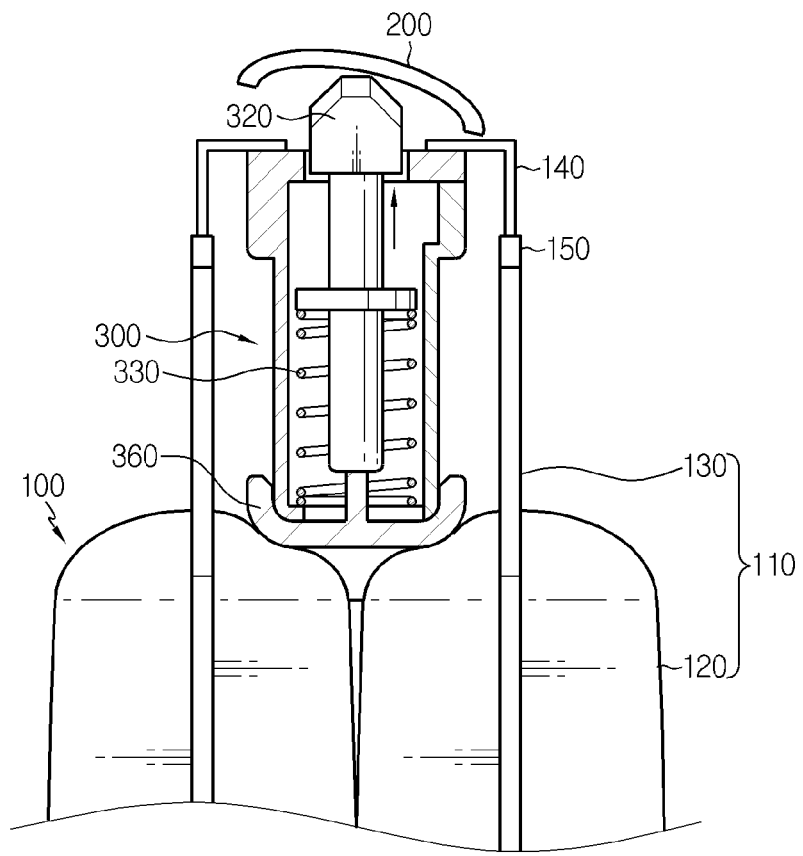
FIG. 5 is a diagram showing a state where the connector breaking device is operated to move the breaking unit upwards so that an electric connection between a connector and an electrode lead is cut off, in the battery module according to an embodiment of the present disclosure.

FIGS. 2 and 3 are diagrams showing a state before a connector breaking device operates in the battery module according to an embodiment of the present disclosure, and FIG. 4 is a diagram showing that the connector breaking device is operated to move a breaking unit upwards, in the battery module according to an embodiment of the present disclosure. In addition, FIG. 5 is a diagram showing a state where the connector breaking device is operated to move the breaking unit upwards so that an electric connection between a connector and an electrode lead is cut off, in the battery module according to an embodiment of the present disclosure.

Referring to FIGS. 2 to 5, a battery module according to an embodiment of the present disclosure includes a pair of battery cells 100, a connector 200, and a connector breaking device 300.

The pair of battery cells 100 may be, for example, pouch-type battery cells, and the pair of battery cells 100 may be stacked with their broad surfaces facing each other to form a battery cell stack. The battery cell 100 may include an electrode assembly (not shown), a pouch case 110, an electrode lead 140, and a sealant 150.

The electrode assembly is configured so that a positive electrode plate, a separator, and a negative electrode plate are stacked in order at least once, and the separator is preferably disposed at an outermost side to ensure insulation. The electrode assembly may have various structures such as a winding type, a stacking type, or a stacking/folding type according to embodiments.

The positive electrode plate is shaped so that a positive electrode active material is coated on at least one surface of a positive electrode current collector made of a conductive plate. Likewise, the negative electrode plate is shaped so that a negative electrode active material is coated on at least one surface of a negative electrode current collector.

The positive electrode plate and the negative electrode plate have uncoated regions that are not coated with the positive electrode active material and the negative electrode active material, and the uncoated regions function as electrode tabs that are coupled to the electrode lead 140.

The separator is located between the positive electrode plate and the negative electrode plate, electrically insulates the positive electrode plate and the negative electrode plate from each other, and may have a porous membrane shape to allow lithium ions to move between the positive electrode plate and the negative electrode plate. The separator may be made of, for example, a porous film using polyethylene (PE) or polypropylene (PP), or a composite film thereof.

The pouch case 110 may be a pouch case made of an exterior material having a multi-layered film shape having a metal layer and a resin layer surrounding the metal layer. The pouch case 110 may include an upper case and a lower case.

Thus, if the pouch case 110 includes the upper case and the lower case as above, the lower case has an accommodation portion 120 convexly protruding to accommodate the electrode assembly. Also, the upper case may have a convexly protruding accommodation portion 120, and may also have a flat shape without the accommodation portion 120.

That is, the battery cell 100 may be a two-side protruding battery cell with both surfaces protruding or a one-side protruding battery cell with only one surface protruding. The figures of the present disclosure just depict a case where the battery cell 100 is a two-side protruding battery cell for convenience of illustration, but the present disclosure is not limited thereto.

Meanwhile, if the battery cell is a two-side protruding battery cell, each of the upper case and the lower case may have a sealing portion 130 corresponding to an outer peripheral region of the accommodation portion 120. In addition, if the battery cell 100 is a one-side protruding battery cell, the lower case may have a sealing portion 130 corresponding to the outer peripheral region of the accommodation portion 120, and the upper case may have a sealing portion 130 formed in a region that is in contact with the sealing portion 130 of the lower case.

The pouch case 110 accommodates the electrode assembly in the accommodation portion 120, and the sealing portions 130 of the upper case and the lower case are contacted and thermally bonded to each other for sealing. As described above, the sealing portions 130 of the upper case and the lower case may be made of a resin material with a thermally-bonding property so as to be adhered by thermal bonding in a mutually abutted state.

The electrode lead 140 is a component connected to the electrode tab of the electrode assembly and drawn out of the pouch case 110 to serve as a medium for electrically connecting the electrode assembly to an external component, and includes a positive electrode lead connected to the positive electrode plate and a negative electrode lead connected to the negative electrode plate. More specifically, the positive electrode lead is connected to the positive electrode uncoated region provided at the positive electrode plate and the negative electrode lead is connected to the negative electrode uncoated region provided at the negative electrode plate.

The positive electrode lead and the negative electrode lead provided at one battery cell 100 may be drawn in the same direction or in opposite directions. The figures of the present disclosure just depict a battery cell 100 in which the positive electrode lead and the negative electrode lead are drawn in opposite directions.

Meanwhile, in describing the present disclosure, among the sealing portions 130, the sealing portion 130 positioned in a direction in which the electrode lead 140 is drawn will be referred to as a terrace portion.

The sealant 150 is interposed between an inner surface of the sealing portion 130 and the electrode lead 140 in order to prevent the sealing force from being lowered between the electrode lead 140 drawn out of the pouch case 110 and the inner surface of the sealing portion 130.

The connector 200 is a component applied to electrically connect neighboring battery cells 100 to each other, and the connector 200 may be implemented to have, for example, a plurality of metal wires in order to minimize the electrical resistance and to be broken quickly and reliably when the connector breaking device 300 is operated.

In this case, the respective metal wires may be connected to the electrode lead 140 of each of the pair of neighboring battery cells by welding or the like. If the connector breaking device 300 as described below is operated, the welding portion between the metal wire and the electrode lead 140 is broken to cut off the electric connection between the neighboring battery cells 100.

The connector breaking device 300 is disposed in a space formed between the terrace portions of a pair of battery cells 100 facing each other. If swelling occurs at the battery cells 100, the connector breaking device 300 is operated with the pressure applied due to the swelling to cut off the electric connection between the connector 200 and the electrode lead 140.

At this time, an end of the electrode lead 140 is bent in the horizontal direction and fixed to a top end of the connector breaking device 300, so that the pressure due to the operation of the connector breaking device 300 may be easily transmitted to the connector 200.

A pushing bar 360 is pushed upwards by the accommodation portion 120 and/or the sealing portion 130 expanded due to the swelling of the battery cell 100, and accordingly, the breaking unit 320 moves upward to apply a pressure to the connector 200 and thus break the coupling portion between the connector 200 and the electrode lead 140, thereby cutting off the electric connection between the neighboring battery cells 100.

The detailed structure and operating principle of the breaking device 300 will be described later in detail with reference to FIGS. 9 to 12.

Next, the location where the connector breaking device 300 is installed in the battery module according to the present disclosure will be described with reference to FIGS. 6 to 8.

Figure 6:
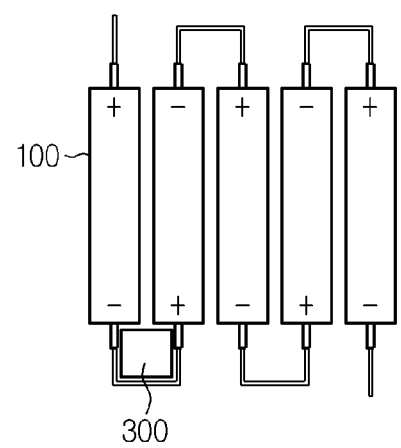
FIGS. 6 to 8 are diagrams showing various positions at which the connector breaking device may be installed, in the battery module including a plurality of battery cells.
Figure 7:
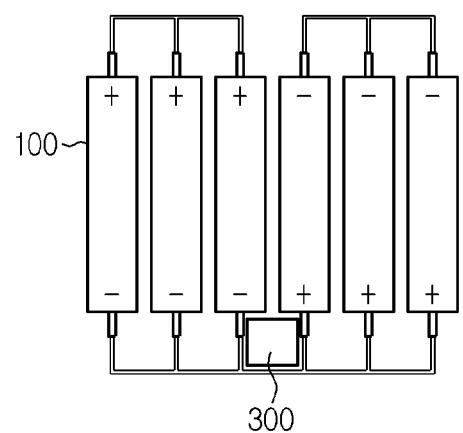
Figure 8:
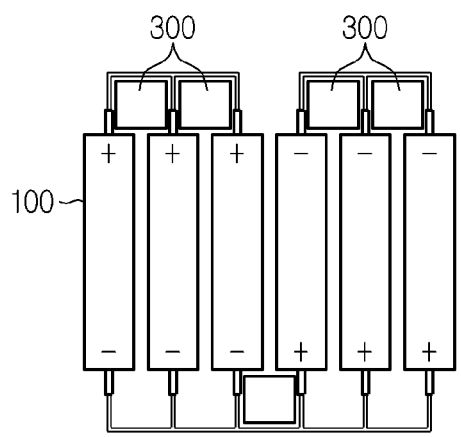

FIGS. 6 to 8 are diagrams showing various positions at which the connector breaking device may be installed, in the battery module including a plurality of battery cells.

Referring to FIGS. 6 to 8, the battery module according to the present disclosure may further include battery cells in addition to the pair of battery cells 100, and the electric connection relation among the plurality of battery cells 100 may be set in various ways.

In the battery module according to the present disclosure, as shown in FIG. 6, the plurality of battery cells 100 may be entirely connected in series. In this case, if any one of the plurality of connectors connecting the pairs of neighboring battery cells 100 is cut off, the electric connections are completely cut off. Thus, the connector breaking device 300 may be installed at only one place among the spaces formed between the terrace portions of the pair of neighboring battery cells 100. In order to more securely ensure the safety, it is also possible to install the connector breaking device 300 at several places in the spaces formed between the terrace portions of the pairs of neighboring battery cells 100.

Also, in the battery module according to the present disclosure, as shown in FIGS. 7 and 8, the plurality of battery cells 100 are divided into a plurality of cell groups, so that the battery cells 100 in the same cell group are connected in parallel and the cell groups are connected in series.

In this case, as shown in FIG. 7, by installing the connector breaking devices 300 in spaces formed between the terrace portions of the pairs of neighboring battery cells 100 belonging to different cell groups, it is possible to cut off the serial connection between the cell groups when cell swelling over a certain level occurs.

Meanwhile, in this case, as shown in FIG. 8, by installing the connector breaking device 300 in every space formed between the terrace portions of the pair of neighboring battery cells 100 belonging to the same cell group, it is possible to cut off the parallel connection in the same cell group when cell swelling over a certain level occurs.

Next, the detailed structure and operation principle of the connector breaking device 300 applied to the battery module according to an embodiment of the present disclosure will be described with reference to FIGS. 9 to 12.

Figure 9:
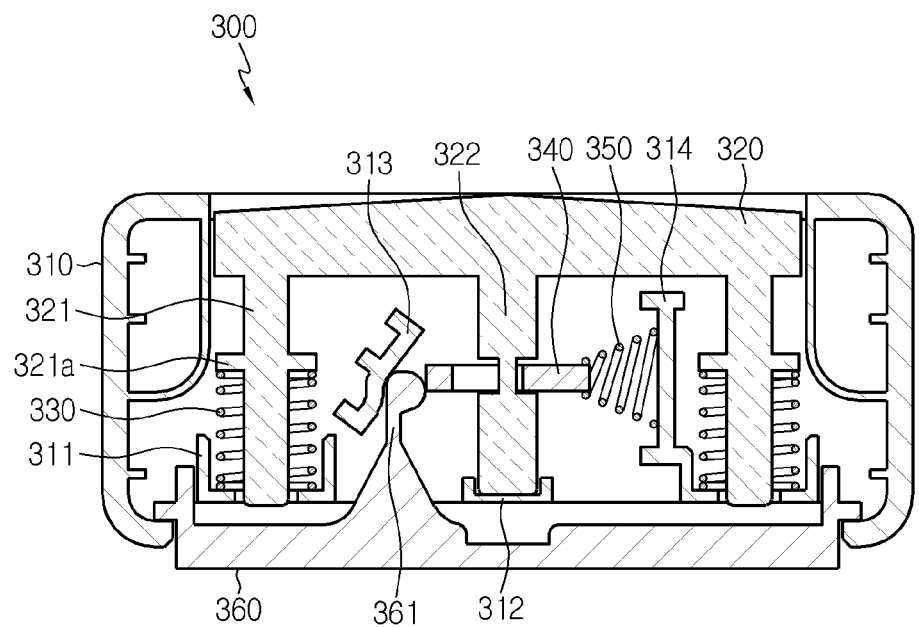
FIG. 9 is a diagram showing an inner configuration of the connector breaking device applied to the battery module according to an embodiment of the present disclosure, in a state before the connector breaking device is operated.
Figure 10:
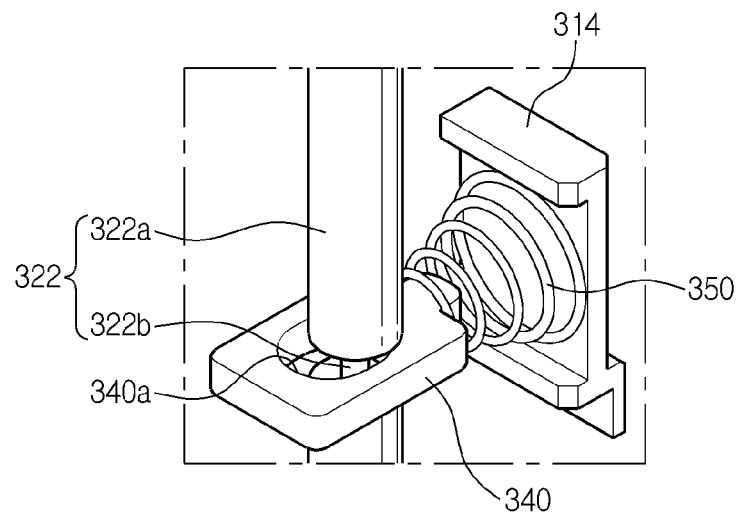
FIG. 10 is a state where the movement of the breaking unit is limited due to a stopper, in the connector breaking device depicted in FIG. 9.
Figure 11:
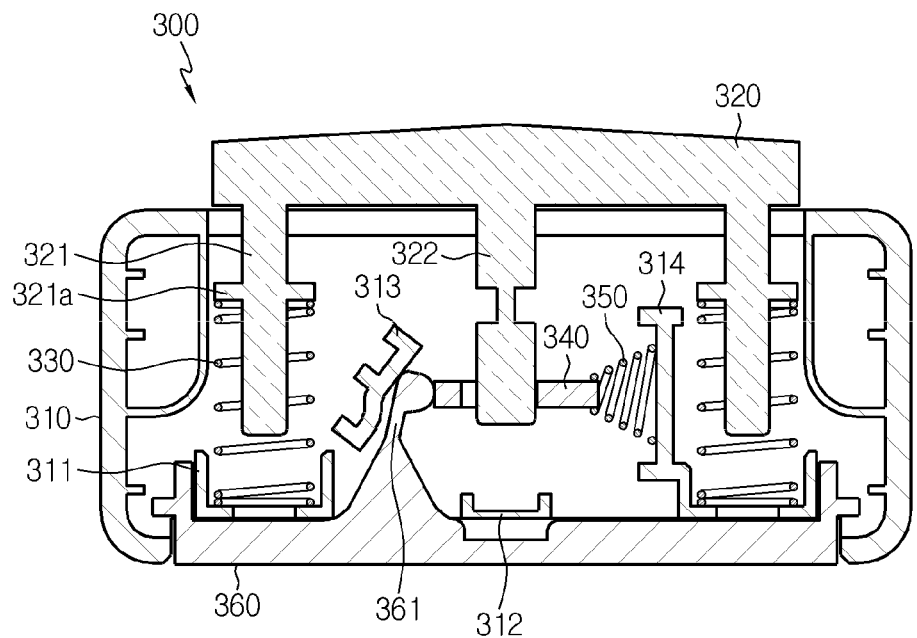
FIG. 11 is a diagram showing an inner configuration of the connector breaking device applied to the battery module according to an embodiment of the present disclosure, in a state after the connector breaking device is operated due to swelling of the battery cell.
Figure 12:
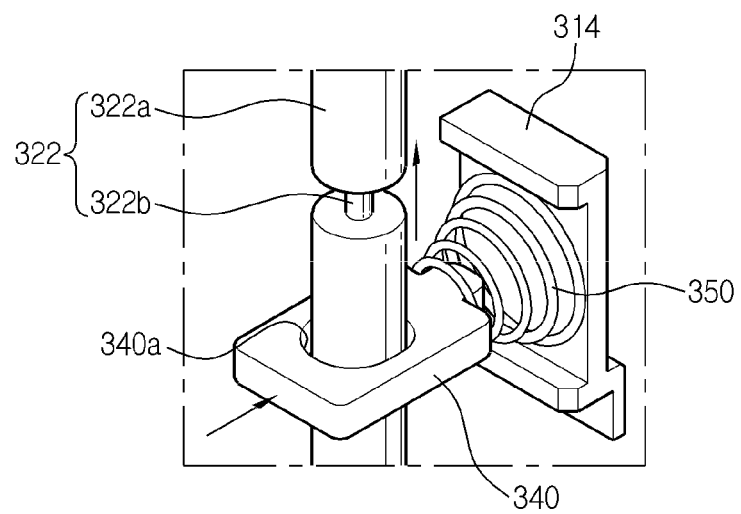
FIG. 12 is a diagram showing a state where the fixed state of the breaking unit due to the stopper is released so that the breaking unit moves upwards, in the connector breaking device depicted in FIG. 11.

FIG. 9 is a diagram showing an inner configuration of the connector breaking device applied to the battery module according to an embodiment of the present disclosure, in a state before the connector breaking device is operated, and FIG. 10 is a state where the movement of the breaking unit is limited due to a stopper, in the connector breaking device depicted in FIG. 9. In addition, FIG. 11 is a diagram showing an inner configuration of the connector breaking device applied to the battery module according to an embodiment of the present disclosure, in a state after the connector breaking device is operated due to swelling of the battery cell, and FIG. 12 is a diagram showing a state where the fixed state of the breaking unit due to the stopper is released so that the breaking unit moves upwards, in the connector breaking device depicted in FIG. 11.

First, referring to FIGS. 9 to 12, the connector breaking device 300 may include a cartridge 310, a breaking unit 320, a first elastic member 330, a stopper 340, a second elastic member 350, and a push bar 360.

The cartridge 310 accommodates the breaking unit 320, the first elastic member 330, the stopper 340, the second elastic member 350 and the push bar 360 in an inner space thereof. The cartridge 310 includes a first placing portion 311 and a second placing portion 312 protruding from an inner surface thereof, a guide rib 313, and a support rib 314.

The first placing portion 311 is formed below a first extension 321 of the breaking unit 320 and the first elastic member 330 to support the first elastic member 330, so that an end of the first extension 321 is placed thereon when the breaking unit 320 reaches a bottom dead point. Similarly, the second placing portion 312 is formed below a second extension 322 of the breaking unit 320 to support an end of the second extension 322 to be placed thereon.

As described later, the first extension 321 may be provided in a pair. In this case, the first placing portion 311 is also provided in a pair, and the second placing portion 312 may be provided between the pair of first placing portions 311.

The guide rib 313 is located between one of the pair of first extensions 321 located at one side and the second extension 322 and is inclined at a predetermined angle with respect to a horizontal line. The guide rib 313 guides the movement of a push rib 361, explained later, so that the push rib 361 moves in the horizontal direction. In other words, the push rib 361 moves upwards identically when the push bar 360 moves upwards. Here, the guide rib 313 functions to change the moving direction of the push bar 360 so that the push bar 360 moving only in the vertical direction may be moved in the horizontal direction.

The support rib 314 is positioned between one of the first extensions 321 located at the other side and the second extension 322 and extends in the vertical direction. The support rib 314 functions to support one side of the second elastic member 350.

The breaking unit 320 is a component that moves upwards through an opening formed at a top end of the cartridge due to the restoring force of the first elastic member 330, which is compressed to store the elastic energy, to break the coupling portion between the connector 200 and the electrode lead 140, thereby cutting off the electric connection between the connector 200 and the electrode lead 140.

The breaking unit 320 includes the first extension 321 and the second extension 322 extending downwards, and the first extension 321 may be provided in a pair for stable movement of the breaking unit 320. In this case, the pair of first extensions 321 may be respectively provided at both ends of the breaking unit 320. If the first extension 321 is provided in a pair, the second extension 322 is located between the pair of first extensions 321.

The first extension 321 may have a substantially elongated cylindrical shape extending in the vertical direction and is formed to have a thickness that may be inserted into the first elastic member 330. The figures of the present disclosure depict just a case where the first extension 321 has a cylindrical shape, but the present disclosure is not limited thereto, and the section of the first extension 321 may have a polygonal shape instead of the circular shape.

The first extension 321 has an elastic member support portion 321a that is formed to have a thickness greater than that of the first elastic member 330, in order to support one side of the first elastic member 330. As a result, both ends of the first elastic member 330 are respectively supported by the elastic member support portion 321a and the first placing portion 311, and the first elastic member 330 behaves to be compressed when the breaking unit 320 moves downwards and to be elongated when the breaking unit 320 moves upwards.

The second extension 322 may have a substantially elongated cylindrical shape extending in the vertical direction and is formed to have a thickness that may be inserted into a perforation hole 340a of the stopper 340. The figures of the present disclosure depict only a case where the second extension 322 has a cylindrical shape, but the present disclosure is not limited thereto, and the section of the second extension 322 may have a polygonal shape instead of the circular shape.

The second extension 322 includes a first portion 322a having a first thickness and a second portion 322b having a second thickness that is thinner than the first portion 322a, and the second portion 322b may be located between the pair of first portions 322a.

In the boundary region between the first portion 322a and the second portion 322b formed with different thicknesses, a step is formed due to a thickness difference. The stopper 340 may use the step to fix the breaking unit 320 not to be moved.

The first elastic member 330 maintains a compressed state in a normal state where swelling over a predetermined level does not occur at the battery cell 100. However, if the pressure is applied to the push bar 360 due to the swelling, the first elastic member 330 is elongated to move the breaking unit 320 upwards by using the elastic energy. The first elastic member 330 may be, for example, a spring.

Both sides of the first elastic member 330 are respectively supported by the elastic member support portion 321a and the first placing portion 311, and the first elastic member 330 behaves to be compressed when the breaking unit 320 moves downwards and to be when the breaking unit 320 moves upwards.

The stopper 340 has a horizontally elongated shape and allows the first elastic member 330 to maintain an elastically compressed state. That is, the stopper 340 fixes the breaking unit 320 so that the breaking unit 320 maintains a state of being moved to the bottom dead point. In addition, if the push bar 360 is compressed due to the pressure applied by the swelling of the battery cell 100, the stopper 340 allows the fixed state of the breaking unit 320 to be released, so that the breaking unit 320 may move upwards toward the connector 200 by the elastic force of the first elastic member 330.

The stopper 340 has a perforation hole 340a formed therethrough in the vertical direction, and the second extension 321 of the breaking unit 320 is inserted into the perforation hole 340a.

The stopper 340 is disposed between the second elastic member 350 and the push rib 361, explained later, and receives a force in a direction toward the push rib 361 by the restoring force of the second elastic member 350. Accordingly, the inner wall of the perforation hole 340a of the stopper 340 is brought into contact with the second portion 322b of the second extension 322, and thus, the stopper 340 is caught to the step formed at the boundary region between the first portion 322*a* and the second portion 322*b* of the second extension 322 so that the breaking unit 320 maintains a fixed state not to move vertically.

Meanwhile, in a state where the stopper 340 is caught to the step, the first elastic member 330 is in the compressed state and the second elastic member 350 is in the elongated state.

The second elastic member 350 maintains an elongated state when the breaking unit 320 is fixed by the stopper 340, and behaviors to be compressed when the pressure due to the swelling is applied to the push bar 360. The second elastic member 330 may be, for example, a spring.

Both sides of the second elastic member 350 are respectively supported by the stopper 340 and the support rib 314. The second elastic member 350 is compressed if the push bar 360 is pressed to move upwards, and the second elastic member 350 is elongated to move the stopper 340 toward the push rib 361 when the push bar 360 is not pressed.

The push bar 360 is installed at a lower portion inside the cartridge 310 and is exposed out of the cartridge 310 through an opening formed at a bottom end of the cartridge 310. The push bar 360 receives the pressure due to the swelling of the battery cell 100 to moves upwards inside the cartridge 310 so that the fixed state of the breaking unit 320 is released.

The push bar 360 includes the push rib 361 that extends upwards toward the guide rib 313, and one end of the push rib 361 is located between the guide rib 313 and the stopper 340. If the push bar 360 moves upwards due to the pressure applied by the swelling, the push rib 361 changes the moving direction by the guide rib 313 to press the stopper 340, and thus the stopper 340 moves in a direction compressing the second elastic member 350.

Referring to FIGS. 10 and 12 together, the fixed state of the breaking unit 320 is released due to the movement of the stopper 340, and thus the breaking unit 320 moves upwards due to the restoring force of the first elastic member 330 to hit the connector 200, so that the coupling portion between the connector 200 and the electrode lead 140 is broken.

As described above, when the swelling over a certain level occurs at the battery cell 100, the battery module according to the present disclosure breaks the coupling portion between connector 200 and the electrode lead 140 by using the connector breaking device 300 disposed between neighboring battery cells 100, and thus it is possible to forcibly cut off the flow of current, thereby ensuring safety in use of a secondary battery.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module, comprising:
a pair of battery cells, each battery cell having an electrode lead, and the battery cells being stacked to face each other;
a connector configured to connect the electrode leads of the battery cells; and
a connector breaking device disposed in a space formed between terrace portions of the battery cells and configured to be operated with a pressure applied to the connector breaking device due to swelling of at least one of the battery cells so as to cut off an electric connection between the connector and the electrode leads, the connector breaking device including:
a cartridge;
a push bar configured to move upwards inside the cartridge in response to the pressure applied to the push bar due to the swelling of the at least one of the battery cells;
a first elastic member configured to maintain an elastically compressed state in a direction along one of the electrode leads prior to the pressure being applied to the push bar and to be released when the push bar moves upwards; and
a breaking unit configured to move toward the connector through an opening formed at a top end of the cartridge due to a restoring force of the first elastic member when the first elastic member is released so as to cut off an electric connection between the connector and the electrode leads.

2. The battery module according to claim 1, wherein the electrode leads are fixed to the connector breaking device.

3. The battery module according to claim 1, wherein the connector breaking device further includes a stopper configured to fix the breaking unit in a fixed state so that the first elastic member maintains the elastically compressed state prior to the pressure being applied to the push bar, the stopper being configured to release the fixed state of the breaking unit when the push bar is pressed due to the swelling of the at least one of the battery cells so that the breaking unit moves toward the connector due to the restoring force of the first elastic member.

4. The battery module according to claim 3, wherein the cartridge includes a guide rib formed to protrude from an inner surface thereof and inclined at a predetermined angle with respect to a horizontal line.

5. The battery module according to claim 4, wherein the push bar includes a push rib extending upwards toward the guide rib and having one end located between the guide rib and the stopper.

6. The battery module according to claim 5, wherein, when the push bar is pressed due to the swelling of the at least one of the battery cells, the push rib changes a moving direction in response to contact with the guide rib so that one end of the push rib applies a pressure to one end of the stopper.

7. The battery module according to claim 6, wherein the stopper moves with a pressure applied by the push rib to release the fixed state of the breaking unit.

8. The battery module according to claim 5, wherein the cartridge includes a support rib formed to protrude from the inner surface thereof, and wherein the connector breaking device includes a second elastic member disposed between the stopper and the support rib to be elastically compressed when the push bar is pressed.

9. The battery module according to claim 8, wherein the first elastic member extends along a first axis and the second elastic member extends along a second axis perpendicular to the first axis.

10. The battery module according to claim 3, wherein the breaking unit includes an extension extending parallel to an axis of the first elastic member, the extension having a first portion having a first thickness and a second portion having a second thickness less than the first thickness, and
wherein the stopper has a through hole configured to receive the extension of the breaking unit, and, when the breaking unit is in the fixed state, the second portion is arranged in the through hole and the first portion is arranged below the through hole.

11. A method to interrupt an electrical connection in a battery module, the method comprising:
providing the battery module according to claim 1; and
operating the connector breaking device by applying the pressure to the connector breaking device due to the swelling of the at least one of the battery cells to cut off the electric connection between the connector and the electrode leads.

12. The method according to claim 11,
wherein operating the connection breaking device includes:
causing the push bar to move upwards inside the cartridge in response to pressure applied to the push bar due to the swelling of the at least one of the battery cells;
releasing the elastically compressed state of the first elastic member in response to the movement upwards of the push bar to provide a restoring force; and
moving the breaking unit toward the connector through the opening formed at the top end of the cartridge due to the restoring force of the first elastic member.

13. The method according to claim 12, wherein the connection breaking device includes a stopper releasably fixing the breaking unit in a fixed state by releasably maintaining the elastically compressed state of the first elastic member, and
wherein operating the connection breaking device further includes displacing the stopper of the connector breaking device to release the fixed state of the breaking unit.

14. The method according to claim 13, wherein the cartridge includes a guide rib formed to protrude from an inner surface thereof and inclined at a predetermined angle with respect to a horizontal line,
wherein the push bar includes a push rib extending upwards toward the guide rib and having one end located between the guide rib and the stopper, and
wherein displacing the stopper of the connector breaking device includes changing a moving direction of the push rib by contact with the guide rib such that the push rib applies pressure to an end of the stopper.

15. The battery module according to claim 1, wherein a tip of the breaking unit does not extend beyond the opening in the top of the cartridge prior to the first elastic member being released.

16. The method according to claim 11, wherein a tip of the breaking unit does not extend beyond the opening in the top of the cartridge prior to the first elastic member being released.

* * * * *